United States Patent
Kontinen et al.

(10) Patent No.: US 10,612,625 B2
(45) Date of Patent: Apr. 7, 2020

(54) PLANET WHEEL ASSEMBLY FOR A PLANETARY GEAR

(71) Applicant: Moventas Gears Oy, Jyväskylä (FI)

(72) Inventors: Tuomo Kontinen, Jyväskylä (FI); Jussi Saastamoinen, Jyväskylä (FI)

(73) Assignee: MOVENTAS GEARS OY, Jyväskylä (FI)

( * ) Notice: Subject to any disclaimer, the term of this patent is extended or adjusted under 35 U.S.C. 154(b) by 0 days.

(21) Appl. No.: 16/163,060

(22) Filed: Oct. 17, 2018

(65) Prior Publication Data
US 2019/0136944 A1     May 9, 2019

(30) Foreign Application Priority Data
Nov. 7, 2017 (EP) ..................... 17200338

(51) Int. Cl.
*F16H 1/28* (2006.01)
*F16C 17/10* (2006.01)
(Continued)

(52) U.S. Cl.
CPC ........... *F16H 1/2809* (2013.01); *F16C 17/10* (2013.01); *F16C 35/02* (2013.01); *F16H 57/08* (2013.01);
(Continued)

(58) Field of Classification Search
None
See application file for complete search history.

(56) References Cited

U.S. PATENT DOCUMENTS

| | | | | |
|---|---|---|---|---|
| 4,428,689 A | * | 1/1984 | Choate | ............... F16C 33/20 384/296 |
| 7,967,712 B2 | * | 6/2011 | Nakamura | .......... F16H 57/0482 475/159 |

(Continued)

FOREIGN PATENT DOCUMENTS

| EP | 2 662 598 A1 | 11/2013 |
|---|---|---|
| EP | 2 679 867 A1 | 1/2014 |

(Continued)

OTHER PUBLICATIONS

European Search Report issued in EP 17 20 0338, dated Apr. 11, 2018.

*Primary Examiner* — Justin Holmes
(74) *Attorney, Agent, or Firm* — Birch, Stewart, Kolasch & Birch, LLP

(57) ABSTRACT

A planet wheel assembly includes a planet shaft, a planet wheel having radial contact surfaces and axial contact surfaces, bushings connected to the planet shaft, radial sliding elements between radial contact surfaces of the bushings and the radial contact surfaces of the planet wheel, and axial sliding elements between axial contact surfaces of the bushings and the axial contact surfaces of the planet wheel. The planet wheel is shaped to constitute a circumferential projection which protrudes radially towards the planet shaft, is axially between the radial sliding elements, and forms the first and second axial contact surfaces of the planet wheel. This arrangement, where the radial sliding elements are axially outmost and the axial sliding elements are on the middle, improves the ability of the radial sliding elements to act against forces tilting the planet wheel.

20 Claims, 3 Drawing Sheets

(51) Int. Cl.
*F16C 35/02* (2006.01)
*F16H 57/08* (2006.01)
*F16H 57/02* (2012.01)

(52) U.S. Cl.
CPC ........ *F16H 57/082* (2013.01); *F16C 2361/61* (2013.01); *F16H 2057/02078* (2013.01); *F16H 2057/085* (2013.01)

(56) References Cited

U.S. PATENT DOCUMENTS

| | | | |
|---|---|---|---|
| 8,840,521 B2* | 9/2014 | Kari | F16C 33/203 475/331 |
| 2009/0190870 A1 | 7/2009 | Chen et al. | |
| 2012/0108380 A1* | 5/2012 | Dinter | F03D 80/70 475/159 |
| 2014/0004992 A1 | 1/2014 | Weist | |

FOREIGN PATENT DOCUMENTS

| | | |
|---|---|---|
| EP | 2 847 497 B1 | 11/2016 |
| SU | 1090941 A | 5/1984 |

\* cited by examiner

PLANET WHEEL ASSEMBLY FOR A PLANETARY GEAR

FIELD OF THE DISCLOSURE

The disclosure relates to a planet wheel assembly for a planetary gear. Furthermore, the disclosure relates to a planetary gear.

BACKGROUND

A planetary gear comprises a planet carrier, a sun shaft, a gear ring, and planet wheels meshing with the sun shaft and with the gear ring. The planet wheels are supported with planet shafts which, in turn, are supported by the planet carrier. Bearings of the planet wheels can rolling-bearings or slide-bearings. An advantage of slide-bearings with respect to rolling-bearings is that slide-bearings require less room in the radial direction and the load carrying surfaces of slide-bearings are larger than those of rolling-bearings. A challenge related to slide-bearings is that they are prone to being damaged during assembly of a planetary gear.

Publication EP2847497 describes a planetary gear comprising planet wheel assemblies based on slide-bearings. Each planet wheel assembly comprises two bushings fixedly connected to a planet shaft. Each of the bushings is L-shaped in the cross-section and has a radial contact surface and an axial contact surface. The bushings are mounted to form a cross-sectional U-shape so that the axial contact surfaces of the bushings are facing towards each other and at least part of a planet wheel is located within the U-shape formed by the L-shaped bushings. The bushings are locked in the axial direction at both outer sides by abutments constituted by a planet carrier. The planet wheel assembly further comprises a radial sliding element between the radial contact surface of each bushing and a respective radial contact surface of the planet wheel, and an axial sliding element between the axial contact surface of each bushing and a respective axial contact surface of the planet wheel. The radial and axial sliding elements can be first mounted on the bushings, and thereafter the resulting assemblies can be placed into the hole of the planet wheel. When the planet shaft is pushed through the holes of the bushings, the radial and axial sliding elements are protected by the bushings and thus the damaging risk of the radial and axial sliding elements is reduced.

The planetary gear described in the publication EP2847497 is, however, not free from challenges. One of the challenges is related to the fact that axial rooms required by axial slide-bearings shorten the axial length available for radial slide-bearings because each radial slide-bearing is located within the above-mentioned U-shape formed by the L-shaped bushings. This limits the ability of the radial slide-bearings to act against forces tending to tilt the geometric rotational axis of the planet wheel with respect to the planet shaft.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In this document, the word "geometric" when used as a prefix means a geometric concept that is not necessarily a part of any physical object. The geometric concept can be for example a geometric point, a straight or curved geometric line, a geometric plane, a non-planar geometric surface, a geometric space, or any other geometric entity that is zero, one, two, or three dimensional.

In accordance with the present invention, there is provided a new planet wheel assembly for a planetary gear. A planet wheel assembly according to the invention comprises:
  a planet shaft,
  a planet wheel for meshing with a sun shaft and with a gear ring, the planet wheel having first and second radial contact surfaces facing radially towards the planet shaft and first and second axial contact surfaces,
  first and second bushings connected to the planet shaft, and
  a first radial sliding element between a radial contact surface of the first bushing and the first radial contact surface of the planet wheel, a second radial sliding element between a radial contact surface of the second bushing and the second radial contact surface of the planet wheel, a first axial sliding element between an axial contact surface of the first bushing and the first axial contact surface of the planet wheel, and a second axial sliding element between an axial contact surface of the second bushing and the second axial contact surface of the planet wheel.

The planet wheel is shaped to constitute a circumferential projection which i) protrudes radially towards the planet shaft, ii) is axially between the first and second radial sliding elements, and iii) has axially facing surfaces constituting the first and second axial contact surfaces of the planet wheel, thereby the axial sliding elements being between the radial sliding elements in the axial direction. The radial and axial sliding elements can be first mounted on the bushings, and thereafter the resulting assemblies can be placed into the hole of the planet wheel. When the planet shaft is pushed through the holes of the bushings, the radial and axial sliding elements are protected by the bushings and thus the damaging risk of the radial and axial sliding elements is reduced.

As the axial sliding elements are between the radial sliding elements in the axial direction, the axial distance between the radial sliding elements can be greater than in cases of the kind described e.g. in EP2847497 where radial sliding elements are between axial sliding elements in the axial direction. The greater axial distance between the radial sliding elements improves their ability to act against forces tending to tilt the geometric rotational axis of the planet wheel with respect to the planet shaft.

In accordance with the present invention, there is provided also a new planetary gear that comprises:
  a sun shaft,
  a gear ring,
  planet wheel assemblies according to the invention, and
  a planet carrier supporting the planet shafts and the planet wheels to mesh with the sun shaft and with the gear ring.

Various exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying embodiments when read in conjunction with the accompanying drawings.

The verbs "to comprise" and "to include" are used in this document as open limitations that neither exclude nor require the existence of also un-recited features. The features recited in the accompanied dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

Exemplifying and non-limiting embodiments of the invention and their advantages are explained in greater detail below in the sense of examples and with reference to the accompanying drawings, in which.

DESCRIPTION OF EXEMPLIFYING AND NON-LIMITING EMBODIMENTS

The specific examples provided in the description below should not be construed as limiting the scope and/or the applicability of the accompanied claims. Lists and groups of examples provided in the description are not exhaustive unless otherwise explicitly stated.

Figure 1A:
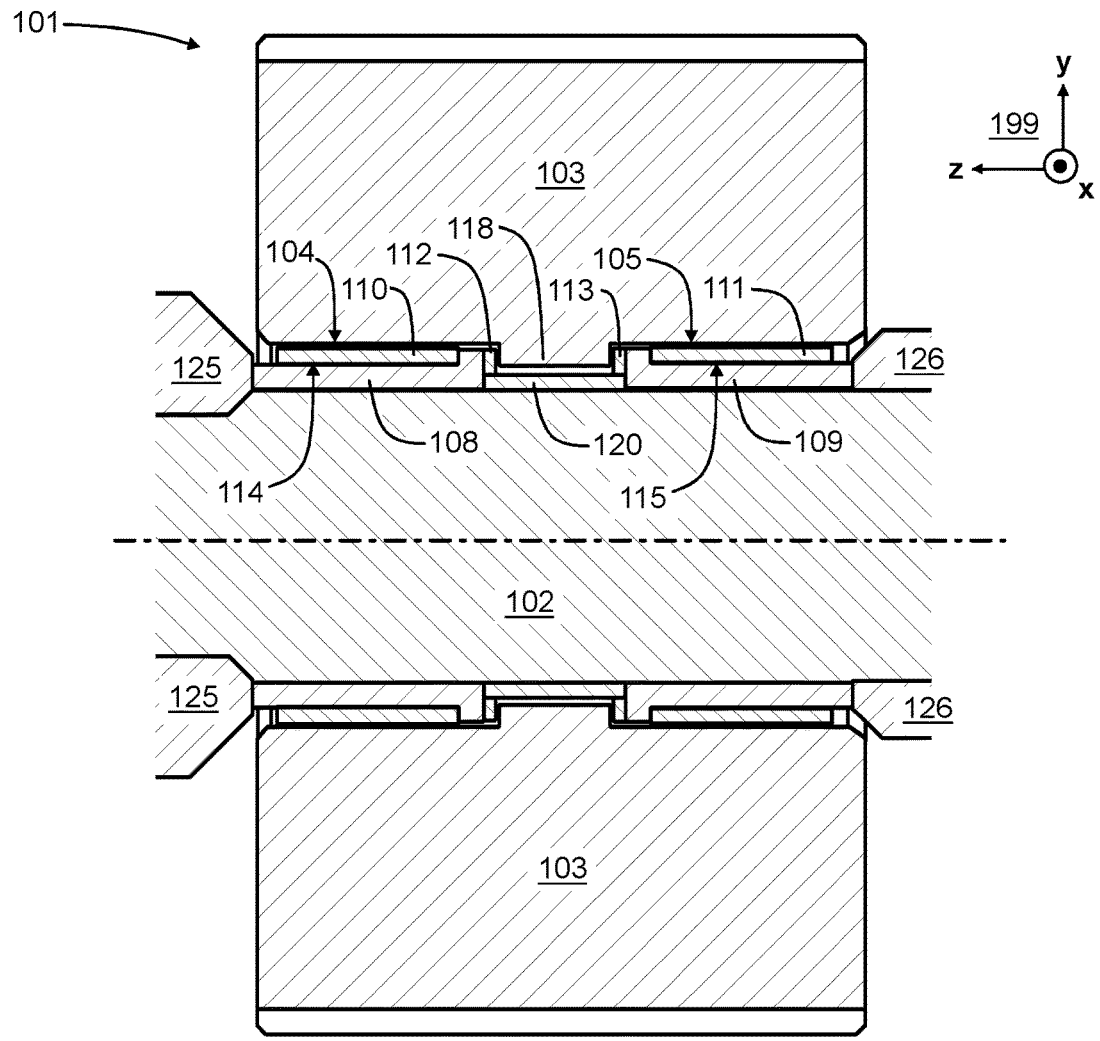
FIGS. 1a and 1b illustrate a planet wheel assembly according to an exemplifying and non-limiting embodiment of the invention.
Figure 1B:
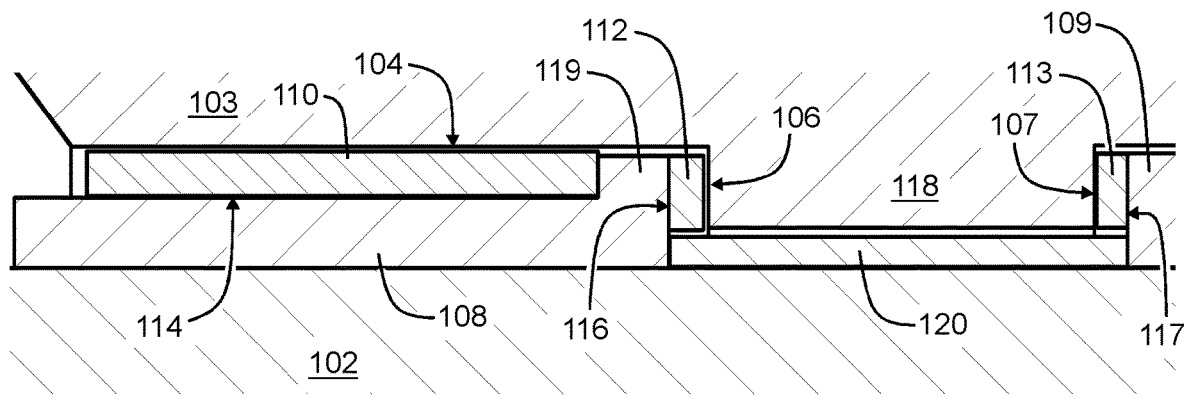

FIG. 1a shows a section view of a planet wheel assembly 101 according to an exemplifying and non-limiting embodiment of the invention. The section is taken along a section plane which is parallel with the yz-plane of a coordinate system 199. FIG. 1b shows also a magnification of a part of the section view of the planet wheel assembly 101. The planet wheel assembly 101 comprises a planet shaft 102 which is fixedly connected to a planet carrier. In FIG. 1a, only portions 125 and 126 of the planet carrier are shown. In FIG. 1a, the geometric center line of the planet shaft 102 is depicted with a dash-and-dot line and the axial direction of the planet wheel shaft 102 is parallel with the z-axis of the coordinate system 199. The planet wheel assembly 101 comprises a planet wheel 103 for meshing with a sun shaft and with a gear ring. In FIG. 1a, the sun shaft and the gear ring are not shown. The planet wheel 103 has first and second radial contact surfaces 104 and 105 facing radially towards the planet shaft 102. Furthermore, the planet wheel 103 has first and second axial contact surfaces 106 and 107. The planet wheel assembly 101 comprises first and second bushings 108 and 109 connected to the planet shaft 103. The planet wheel assembly 101 comprises a first radial sliding element 110 between a radial contact surface 114 of the bushing 108 and the radial contact surface 104 of the planet wheel 103. The planet wheel assembly 101 comprises a second radial sliding element 111 between a radial contact surface 115 of the bushing 109 and the radial contact surface 105 of the planet wheel 103. The planet wheel assembly 101 comprises a first axial sliding element 112 between an axial contact surface 116 of the bushing 108 and the axial contact surface 106 of the planet wheel 103. The planet wheel assembly 101 comprises a second axial sliding element 113 between an axial contact surface 117 of the bushing 109 and the axial contact surface 107 of the planet wheel 103.

The radial sliding elements 110 and 111 as well as the axial sliding elements 112 and 113 can be according to known slide-bearing technology. The material of the sliding elements 110-113 can be for example white metal, and the material of the planet wheel 193 and the bushings 108 and 109 can be for example steel. It is also possible that the radial sliding elements 110 and 111 and/or the axial sliding elements 112 and 113 are multilayer elements each of which comprises a backing made of e.g. steel, one or more intermediate layers made of one or more suitable materials that are softer than the material of the backing, and a surface coating for providing appropriate sliding properties and wear resistance.

As illustrated in FIGS. 1a and 1b, the planet wheel 103 is shaped to constitute a circumferential projection 118 having a rectangular cross-section and protruding radially towards the planet shaft 102. As shown in FIG. 1a, the circumferential projection 118 is located between the radial sliding elements 110 and 111 in the axial direction. The circumferential projection 118 has axially facing surfaces which constitute the axial contact surfaces 106 and 107 of the planet wheel 103. As the axial sliding elements 112 and 113 are between the radial sliding elements 110 and 111 in the axial direction, the axial distance between the radial sliding elements 110 and 111 can be greater. The greater axial distance between the radial sliding elements 110 and 111 improves their ability to act against forces tending to tilt the geometric rotational axis of the planet wheel 103 with respect to the planet shaft 102.

In a planet wheel assembly according to an exemplifying and non-limiting embodiment of the invention, the outer surfaces of the radial sliding elements 110 and 111 constitute sliding surfaces for radially supporting the planet wheel 103 rotatably with respect to the planet shaft 102 and the inner surfaces of the radial sliding elements 110 and 111 are fixedly connected to the bushings 108 and 109. In a planet wheel assembly according to another exemplifying and non-limiting embodiment of the invention, the radial sliding elements 110 and 111 are floating so that both their inner and outer surfaces constitute sliding surfaces for radially supporting the planet wheel 103 rotatably with respect to the planet shaft 102. In a planet wheel assembly according to an exemplifying and non-limiting embodiment of the invention, the surfaces of the axial sliding elements 112 and 113 facing towards the circumferential projection 118 constitute sliding surfaces for axially supporting the planet wheel 103 rotatably with respect to the planet shaft 102 and the surfaces of the axial sliding elements 112 and 113 facing away from the circumferential projection 118 are fixedly connected to the bushings 108 and 109. In a planet wheel assembly according to an exemplifying and non-limiting embodiment of the invention, the axial sliding elements 112 and 113 are floating so that all axially facing surfaces of the axial sliding elements 112 and 113 constitute sliding surfaces for axially supporting the planet wheel 103 rotatably with respect to the planet shaft 102.

In a planet wheel assembly according to an exemplifying and non-limiting embodiment of the invention, each of the bushings 108 and 109 comprises a collar at an end of the bushing comprising the axial contact surface of the bushing under consideration. In FIG. 1b, the collar of the bushing 108 is denoted with a reference 119. As shown in FIG. 1a, the collars define the locations of the radial sliding elements 110 and 111 so that the radial sliding element 110 abuts on the collar 119 of the bushing 108 in the negative z-direction of the coordinate system 199 and the radial sliding element 111 abuts on the collar of the bushing 109 in the positive z-direction of the coordinate system 199.

A planet wheel assembly according to an exemplifying and non-limiting embodiment of the invention comprises a spacer structure 120 that determines a minimum axial distance between the axial contact surfaces 116 and 117 of the bushings 108 and 109. In the exemplifying planet wheel assembly illustrated in FIG. 1a and 1b, the spacer structure 120 is a spacer bushing which is connected to the planet shaft 102 and which is axially between the bushings 108 and 109. As shown in FIG. 1a and 1b, there is a radial gap between the spacer bushing and the circumferential projection 118 of the planet wheel 103.

Figure 2A:
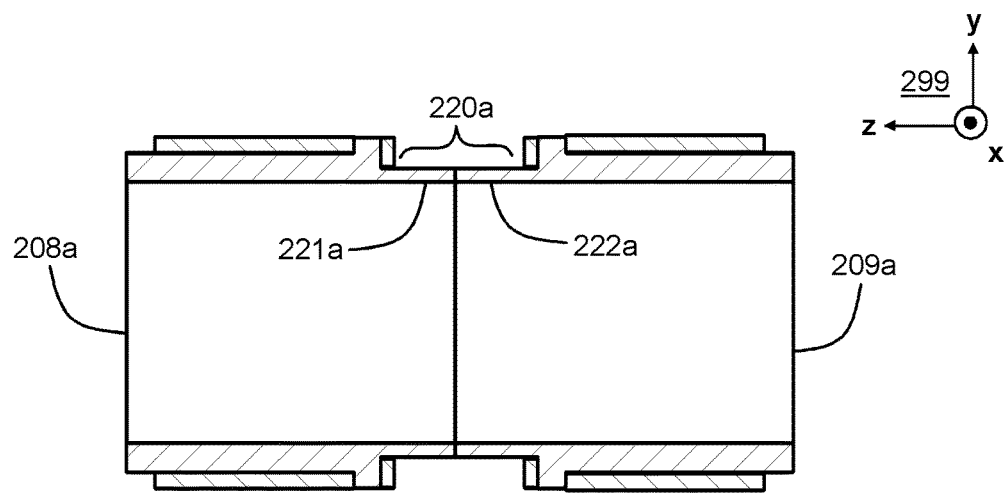
FIGS. 2a, 2b, and 2c illustrate details of planet wheel assemblies according to exemplifying and non-limiting embodiments of the invention.
Figure 2B:
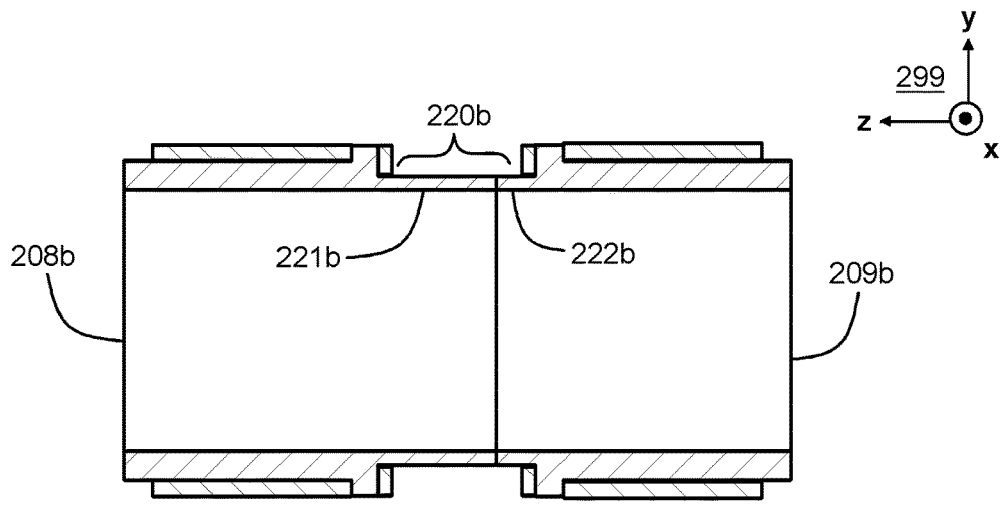
Figure 2C:
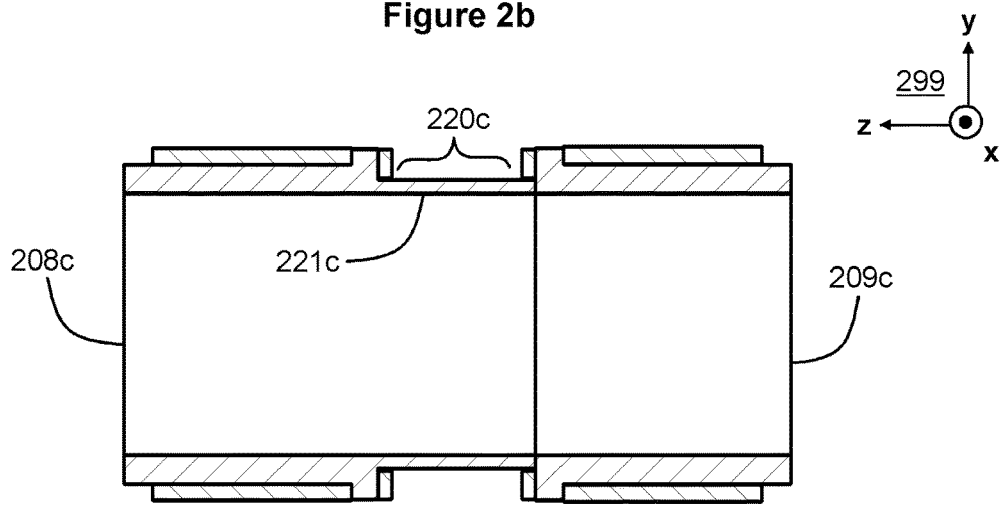

FIGS. 2a, 2b, and 2c show section views of bushings and sliding elements of planet wheel assemblies according to exemplifying and non-limiting embodiments of the invention. The sections are taken along a section plane which is parallel with the yz-plane of a coordinate system 299. FIGS. 2a-2c illustrate different spacer structures 220a, 220b, and 220c for determining a minimum axial distance between the axial contact surfaces of the bushings. In the exemplifying case illustrated in FIG. 2a, the spacer structure 220a is implemented with bushings 208a and 209a so that the bushing 208a comprises a spacer section 221a and the bushing 209a comprises a spacer section 222a. In this exemplifying case, the bushings 208a and 209a are similar to each other. In the exemplifying case illustrated in FIG. 2b, the spacer structure 220b is implemented with bushings 208b and 209b so that the bushing 208b comprises a spacer section 221b and the bushing 209b comprises a spacer section 222b that is different from the spacer section 221b. In the exemplifying case illustrated in FIG. 2c, the spacer structure 220c is implemented with only one of bushings 208c and 209c so that the bushing 208c comprises a spacer section 221c.

Figure 3:
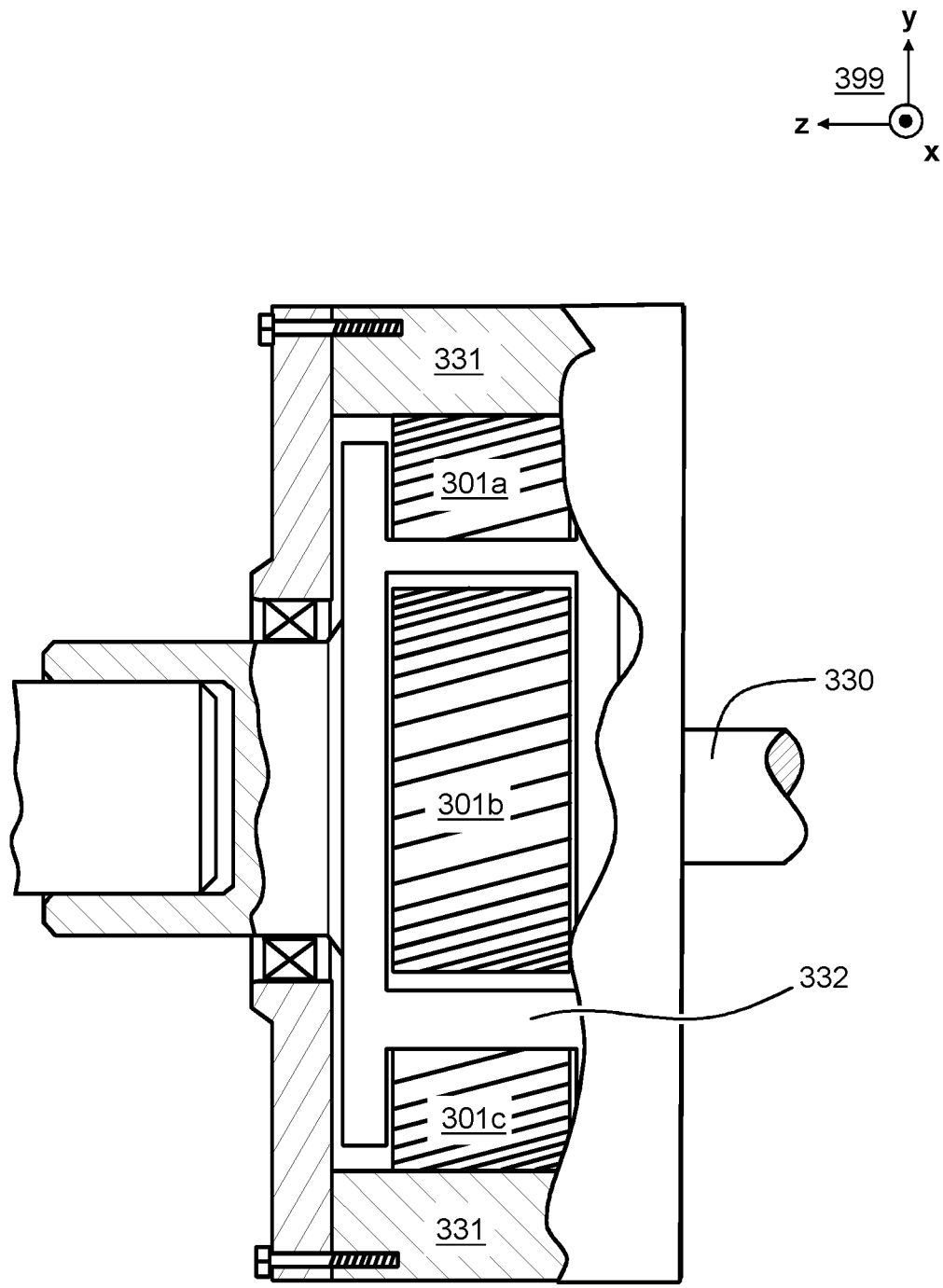
FIG. 3 illustrates a planetary gear according to an exemplifying and non-limiting embodiment of the invention.

FIG. 3 illustrates a planetary gear according to an exemplifying and non-limiting embodiment of the invention. The planetary gear comprises a sun shaft 330, a gear ring 331, a planet carrier 332, and planet wheel assemblies according to an exemplifying and non-limiting embodiment of the invention. In FIG. 3, three of the planet wheel assemblies are denoted with references 301a, 301b, and 301c. The planet carrier 332 is arranged to support the planet wheels so that the planet wheels are meshing with the sun shaft and with the gear ring 331. The planet wheel assemblies can be for example such as illustrated in FIG. 1a and 1b. In the exemplifying case illustrated in FIG. 3, there are four planet wheels. In a planetary gear according to another exemplifying and non-limiting embodiment of the invention, there can be for example 2, 3, or more than four planet wheels. In the exemplifying case illustrated in FIG. 3, the gear ring 331 is stationary and the planet carrier 332 and the sun shaft 330 are rotatable. It is also possible that e.g. the sun shaft is stationary and the planet wheel carrier and the gear ring are rotatable.

The specific examples provided in the description given above should not be construed as limiting the scope and/or the applicability of the accompanied claims. Lists and groups of examples provided in the description given above are not exhaustive unless otherwise explicitly stated.

What is claimed is:

1. A planet wheel assembly for a planetary gear, the planet wheel assembly comprising:
    a planet shaft,
    a planet wheel for meshing with a sun shaft and with a gear ring, the planet wheel having first and second radial contact surfaces facing radially towards the planet shaft and first and second axial contact surfaces,
    first and second bushings connected to the planet shaft, and
    a first radial sliding element between a radial contact surface of the first bushing and the first radial contact surface of the planet wheel, a second radial sliding element between a radial contact surface of the second bushing and the second radial contact surface of the planet wheel, a first axial sliding element between an axial contact surface of the first bushing and the first axial contact surface of the planet wheel, and a second axial sliding element between an axial contact surface of the second bushing and the second axial contact surface of the planet wheel,
    wherein the planet wheel is shaped to constitute a circumferential projection which i) protrudes radially towards the planet shaft, ii) is axially between the first and second radial sliding elements, and iii) has axially facing surfaces constituting the first and second axial contact surfaces of the planet wheel.

2. A planet wheel assembly according to claim 1, wherein the first bushing comprises a collar at an end of the first bushing comprising the axial contact surface of the first bushing and the second bushing comprises a collar at an end of the second bushing comprising the axial contact surface of the second bushing, the first radial sliding element abutting on the collar of the first bushing in a first axial direction and the second radial sliding element abutting on the collar of the second bushing in a second axial direction opposite to the first axial direction.

3. A planet wheel assembly according to claim 1, wherein the planet wheel assembly further comprises a spacer structure determining a minimum axial distance between the axial contact surfaces of the first and second bushings.

4. A planet wheel assembly according to claim 2, wherein the planet wheel assembly further comprises a spacer structure determining a minimum axial distance between the axial contact surfaces of the first and second bushings.

5. A planet wheel assembly according to claim 3, wherein the spacer structure is a spacer bushing connected to the planet shaft and being axially between the first and second bushings, there being a radial gap between the spacer bushing and the circumferential projection of the planet wheel.

6. A planet wheel assembly according to claim 3, wherein the spacer structure is implemented with at least one of the first and second bushings so that at least one of the first and second bushings comprises a spacer section protruding axially towards another one of the first and second bushings so that there is a radial gap between each spacer section and the circumferential projection of the planet wheel.

7. A planet wheel assembly according to claim 4, wherein the spacer structure is a spacer bushing connected to the planet shaft and being axially between the first and second bushings, there being a radial gap between the spacer bushing and the circumferential projection of the planet wheel.

8. A planet wheel assembly according to claim 4, wherein the spacer structure is implemented with at least one of the first and second bushings so that at least one of the first and second bushings comprises a spacer section protruding axially towards another one of the first and second bushings so that there is a radial gap between each spacer section and the circumferential projection of the planet wheel.

9. A planet wheel assembly according to claim 1, wherein outer surfaces of the first and second radial sliding elements constitute sliding surfaces for radially supporting the planet wheel rotatably with respect to the planet shaft.

10. A planet wheel assembly according to claim 1, wherein inner surfaces of the first and second radial sliding elements constitute sliding surfaces for radially supporting the planet wheel rotatably with respect to the planet shaft.

11. A planet wheel assembly according to claim 1, wherein surfaces of the first and second axial sliding element facing towards the circumferential projection constitute sliding surfaces for axially supporting the planet wheel rotatably with respect to the planet shaft.

12. A planet wheel assembly according to claim 1, wherein surfaces of the first and second axial sliding element facing towards the first and second bushings constitute sliding surfaces for axially supporting the planet wheel rotatably with respect to the planet shaft.

13. A planetary gear comprising: a sun shaft, a gear ring, a planet carrier, and planet wheel assemblies, wherein each of the planet wheel assemblies comprises:
   a planet shaft supported by the planet carrier,
   a planet wheel meshing with the sun shaft and with the gear ring, the planet wheel having first and second radial contact surfaces facing radially towards the planet shaft and first and second axial contact surfaces,
   first and second bushings connected to the planet shaft, and
   a first radial sliding element between a radial contact surface of the first bushing and the first radial contact surface of the planet wheel, a second radial sliding element between a radial contact surface of the second bushing and the second radial contact surface of the planet wheel, a first axial sliding element between an axial contact surface of the first bushing and the first axial contact surface of the planet wheel, and a second axial sliding element between an axial contact surface of the second bushing and the second axial contact surface of the planet wheel,
wherein the planet wheel is shaped to constitute a circumferential projection which i) protrudes radially towards the planet shaft, ii) is axially between the first and second radial sliding elements, and iii) has axially facing surfaces constituting the first and second axial contact surfaces of the planet wheel.

14. A planetary gear according to claim 13, wherein the first bushing comprises a collar at an end of the first bushing comprising the axial contact surface of the first bushing and the second bushing comprises a collar at an end of the second bushing comprising the axial contact surface of the second bushing, the first radial sliding element abutting on the collar of the first bushing in a first axial direction and the second radial sliding element abutting on the collar of the second bushing in a second axial direction opposite to the first axial direction.

15. A planetary gear according to claim 13, wherein each of the planet wheel assemblies further comprises a spacer structure determining a minimum axial distance between the axial contact surfaces of the first and second bushings.

16. A planetary gear according to claim 14, wherein each of the planet wheel assemblies further comprises a spacer structure determining a minimum axial distance between the axial contact surfaces of the first and second bushings.

17. A planetary gear according to claim 15, wherein the spacer structure is a spacer bushing connected to the planet shaft and being axially between the first and second bushings, there being a radial gap between the spacer bushing and the circumferential projection of the planet wheel.

18. A planetary gear according to claim 15, wherein the spacer structure is implemented with at least one of the first and second bushings so that at least one of the first and second bushings comprises a spacer section protruding axially towards another one of the first and second bushings so that there is a radial gap between each spacer section and the circumferential projection of the planet wheel.

19. A planetary gear according to claim 16, wherein the spacer structure is a spacer bushing connected to the planet shaft and being axially between the first and second bushings, there being a radial gap between the spacer bushing and the circumferential projection of the planet wheel.

20. A planetary gear according to claim 16, wherein the spacer structure is implemented with at least one of the first and second bushings so that at least one of the first and second bushings comprises a spacer section protruding axially towards another one of the first and second bushings so that there is a radial gap between each spacer section and the circumferential projection of the planet wheel.

* * * * *